United States Patent
Hooker et al.

(10) Patent No.: US 8,552,333 B2
(45) Date of Patent: Oct. 8, 2013

(54) SYSTEMS, METHODS, AND APPARATUS FOR PREVENTING ELECTROMIGRATION BETWEEN PLASMA GUN ELECTRODES

(75) Inventors: John Kenneth Hooker, Louisville, KY (US); Hardik Upadhyay, Monroe, CT (US); Gitika Tantuwaya, Louisville, KY (US)

(73) Assignee: General Electric Company, Schenectady, NY (US)

( * ) Notice: Subject to any disclaimer, the term of this patent is extended or adjusted under 35 U.S.C. 154(b) by 232 days.

(21) Appl. No.: 12/982,005

(22) Filed: Dec. 30, 2010

(65) Prior Publication Data
US 2012/0168410 A1 Jul. 5, 2012

(51) Int. Cl.
*B23K 10/00* (2006.01)

(52) U.S. Cl.
USPC .............. 219/121.44; 219/121.36; 219/121.54

(58) Field of Classification Search
CPC ....................................................... B23K 10/00
USPC .............. 219/121.48, 121.54, 121.57, 121.39, 219/121.45, 75; 313/231.41; 315/111.21
See application file for complete search history.

(56) References Cited

U.S. PATENT DOCUMENTS

| 7,474,008 B2 | 1/2009 | Fukuta et al. |
| 2007/0284610 A1 | 12/2007 | Kawaura et al. |
| 2008/0036508 A1 | 2/2008 | Sakamoto et al. |
| 2009/0134129 A1 | 5/2009 | Robarge et al. |

FOREIGN PATENT DOCUMENTS

EP 0513405 A1 11/1992

OTHER PUBLICATIONS

Search Report and Written Opinion from corresponding EP Application No. 11194813, Jun. 8, 2012.

*Primary Examiner* — Mark Paschall
(74) *Attorney, Agent, or Firm* — General Electric Company

(57) ABSTRACT

A circuit protection device includes a plasma gun configured to generate a plasma plume, at least one capacitor configured to store electrical energy, and a trigger circuit communicatively coupled to the plasma gun and the capacitor. The trigger circuit is configured to transmit a first signal to the capacitor to cause the capacitor to transmit a first portion of the electrical energy to the plasma gun. The trigger circuit is also configured to transmit a second signal to the plasma gun to cause the plasma gun to generate the plasma plume using the first portion of the electrical energy.

20 Claims, 5 Drawing Sheets

SYSTEMS, METHODS, AND APPARATUS FOR PREVENTING ELECTROMIGRATION BETWEEN PLASMA GUN ELECTRODES

BACKGROUND OF THE INVENTION

The embodiments described herein relate generally to a circuit protection device and, more particularly, to an apparatus for use in triggering release of stored electrical energy from a capacitor bank to a plurality of electrodes in a circuit protection device.

Known electric power circuits and switchgear generally have conductors that are separated by insulation, such as air, or gas or solid dielectrics. However, if the conductors are positioned too closely together, or if a voltage between the conductors exceeds the insulative properties of the insulation between the conductors, an arc can occur. For example, the insulation between the conductors can become ionized, which makes the insulation conductive and enables formation of an arc flash.

An arc flash includes a rapid release of energy due to a fault between two phase conductors, between a phase conductor and a neutral conductor, or between a phase conductor and a ground point. Arc flash temperatures can reach or exceed 20,000° C., which can vaporize the conductors and adjacent equipment. Moreover, an arc flash can release significant energy in the form of not only heat, but also intense light, pressure waves, and/or sound waves, sufficient to damage the conductors and adjacent equipment. However, the current level of a fault that generates an arc flash is generally less than the current level of a short circuit, such that a circuit breaker generally does not trip or exhibits a delayed trip unless the circuit breaker is specifically designed to handle an arc fault condition.

Another known circuit protection device that exhibits a sufficiently rapid response is an arc containment device, which creates a contained arc to divert the electrical energy away from the arc flash point. For example, some known devices include generate an arc, such as a secondary arc flash, for use in dissipating energy associated with a primary arc flash detected on a circuit. Such devices often include a number of high voltage and high energy capacitors for use in initiating the secondary arc flash within an enclosure that is designed to safely contain the energy released by the secondary arc flash. These capacitors can be used to provide energy to an ablative plasma gun that releases plasma into a gap between a plurality of electrodes to facilitate formation of the secondary arc flash. However, if the plasma gun electrodes are constantly charged, the electrical isolation in the gap can decrease over time, thereby enabling nuisance triggers of the plasma gun.

BRIEF DESCRIPTION OF THE INVENTION

In one aspect, a circuit protection device includes a plasma gun configured to generate a plasma plume, at least one capacitor configured to store electrical energy, and a trigger circuit communicatively coupled to the capacitor and to the plasma gun. The trigger circuit is configured to transmit a first signal to the capacitor to cause the capacitor to transmit a first portion of the electrical energy to the plasma gun, and to transmit a second signal to the plasma gun to cause the plasma gun to generate the plasma plume using the first portion of the electrical energy.

In another aspect, a controller is provided for use with a circuit protection device having a plasma gun. The controller includes a plurality of capacitors including a plurality of first capacitors configured to provide electrical energy to the plasma gun, and a second capacitor configured to transmit a pulse to the plasma gun to cause the plasma gun to create a plasma plume. The controller also includes a trigger circuit communicatively coupled to the plurality of capacitors. The trigger circuit is configured to receive a signal indicative of a fault, cause the plurality of first capacitors to transmit the electrical energy to the plasma gun, and cause the second capacitor to transmit the pulse to the plasma gun.

In another aspect, a method is provided for triggering generation of a plasma plume by a circuit protection device having a plasma gun, at least one first capacitor, and at least one second capacitor. The method includes receiving a signal indicative of a fault, transmitting a first signal to the first capacitor to cause the first capacitor to transmit stored electrical energy to the plasma gun, and transmitting a second signal to the plasma gun to cause the plasma gun to generate the plasma plume using the electrical energy.

DETAILED DESCRIPTION OF THE INVENTION

Exemplary embodiments of systems, methods, and apparatus for use in preventing electromigration of energy between plasma gun electrodes are described hereinabove. These embodiments facilitate transferring a first portion of stored electrical energy from a capacitor bank to the plasma gun electrodes only upon detection of a fault in a circuit, such as a primary arc flash. Moreover, these embodiments facilitate using the electrical energy to create an ablative plasma plume only after transmission of a second portion of the stored electrical energy, in the form of a trigger pulse, to the plasma gun electrodes from an ignition coil coupled to a second capacitor. Separating the transmission of the stored energy and the transmission of the trigger pulse facilitates preventing break down between the plasma gun electrodes, thereby reducing the opportunity for nuisance triggers.

Figure 1:
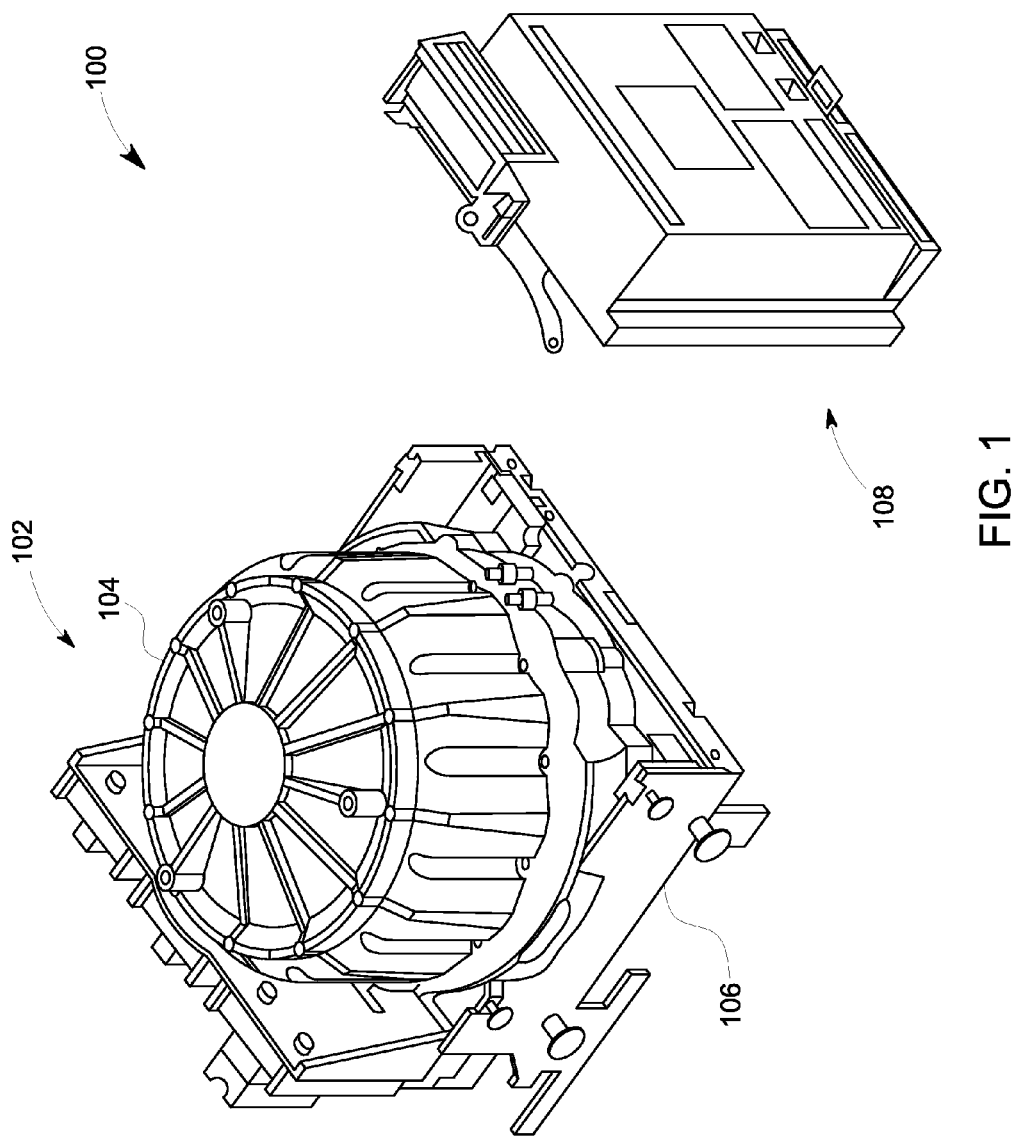
FIG. 1 is a perspective view of an exemplary circuit protection device for use with power distribution equipment.

FIG. 1 is a perspective view of an exemplary circuit protection device 100 for use with power distribution equipment. Device 100 includes a containment assembly 102 that includes a plurality of main electrodes (not shown) separated by a main gap of air or another gas. Each main electrode is coupled to an electrically different portion of a power circuit, such as different phases, neutral, or ground. Containment assembly 102 also includes a trigger circuit (not shown) that activates an ablative plasma gun (not shown) by transmitting an electrical pulse to the plasma gun. In response to the pulse, the plasma gun emits ablative plasma that facilitates the creation of an arc between the main electrodes. The arc is created to divert energy from an arc flash elsewhere on the circuit for protection of the circuit. Moreover, containment assembly 102 includes an outer cover 104 that contains and isolates the energy created by the arc. Containment assembly 102 is sized to be coupled to a cassette 106 so that containment assembly 102 can be inserted into an equipment enclosure (not shown). Moreover, device 100 includes a controller 108 that is communicatively coupled to containment assembly 102. Controller 108 receives signals from one or more sensors (not shown) that monitor the circuit to detect an arc flash. The sensors may monitor a current through a portion of the circuit and/or a voltage across multiple portions of the circuit. The sensors may also detect a light flash that can be produced by an arc flash. In response to the signals, controller 108 activates the plasma gun within containment assembly 102 to initiate an arc.

Figure 2:
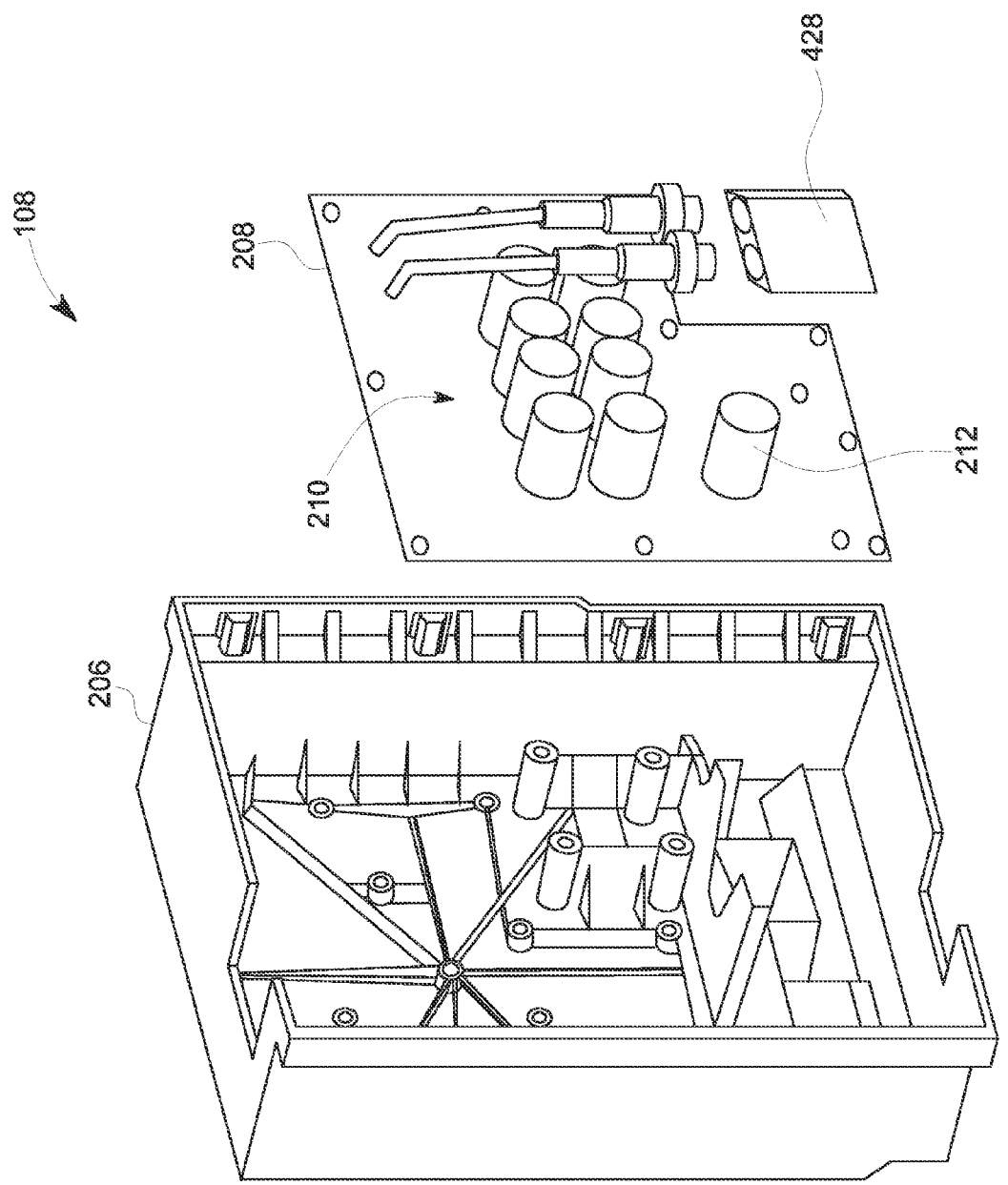
FIG. 2 is a partial exploded view of a controller that may be used with the circuit protection device shown in FIG. 1.

FIG. 2 is a partial exploded view of controller 108, which includes a housing 206 sized to contain a printed circuit board (PCB) 208. PCB 208 includes a plurality of first capacitors 210 and one or more second capacitors 212 electrically coupled thereto. First capacitors 210 may also be referred to herein as activation capacitors, and are used to provide power to a plasma gun (not shown) of containment device 102 (shown in FIG. 1) for use in creating an arc within containment device 102. Second capacitor 212 may also be referred to herein as a pulse capacitor, and is used to provide a pulse signal through an autotransformer (not shown) to the plasma gun after the power is provided to the plasma gun. The pulse signal causes the plasma gun to create an arc plume.

Figure 3:
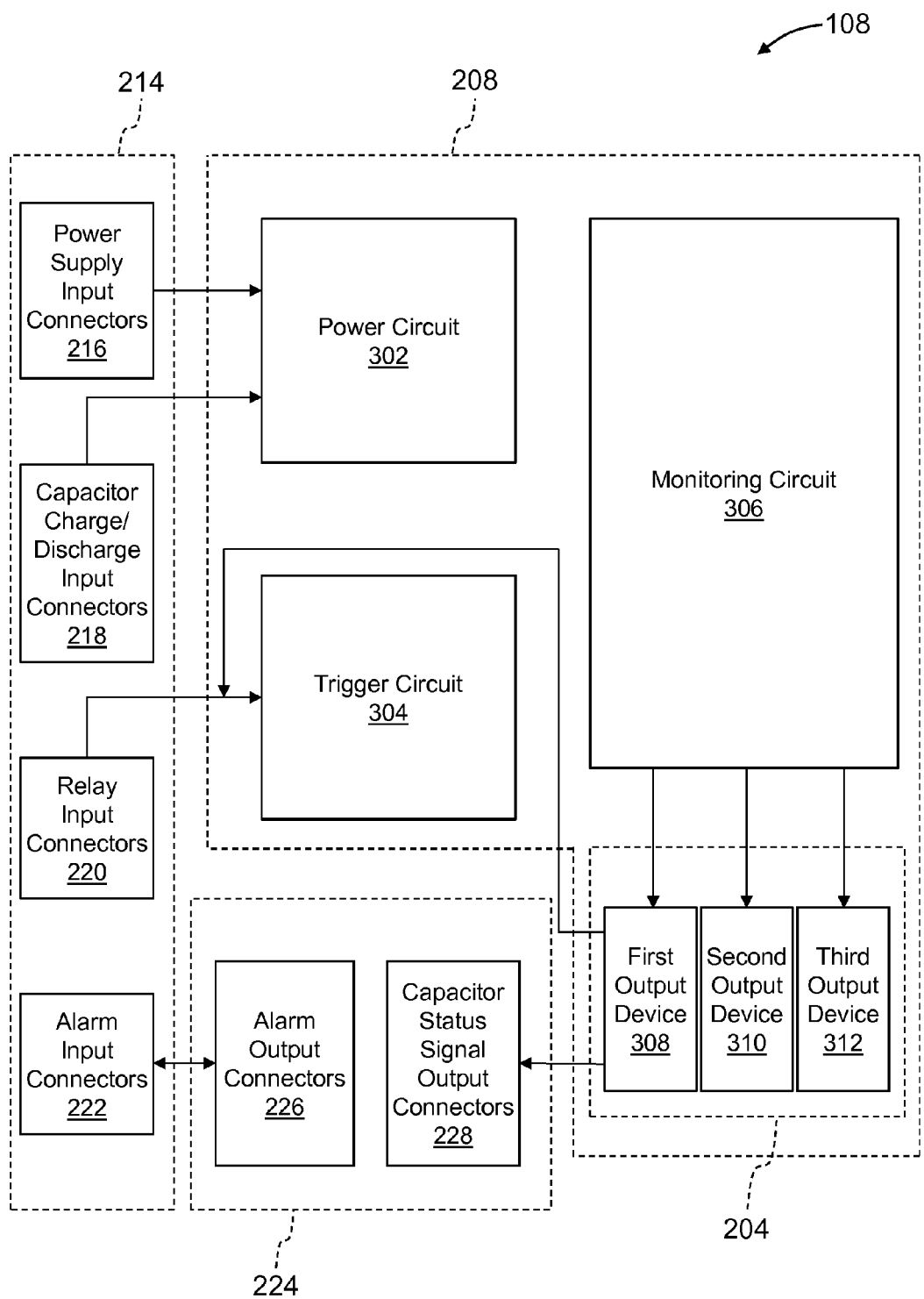
FIG. 3 is a schematic block diagram of the controller shown in FIG. 2.

FIG. 3 is a schematic block diagram of controller 108. In the exemplary embodiment, controller 108 includes a plurality of input connectors 214 including, for example and not by way of limitation, power supply input connectors 216, capacitor charge/discharge device input connectors 218, relay input connectors 220, and alarm input connectors 222. Power supply input connectors 216 facilitate receiving power from a power supply (not shown) for use in powering controller 108 and providing energy to the plasma gun. Capacitor charge/discharge device input connectors 218 facilitate receiving a user input to charge first capacitors 210 and second capacitor 212 (shown in FIG. 2) and/or a user input to discharge first capacitors 210 and second capacitor 212. Relay input connectors 220 facilitate receiving a signal indicative of an arc flash detection in a circuit and causing the plasma gun to create an arc plume to transfer the arc flash energy into arc containment device 102 (shown in FIG. 1). Alarm input connectors 222 receive signals from an alarm device (not shown). Moreover, controller 108 includes a plurality of output connectors 224 including, for example, alarm output connectors 226 and capacitor status signal output connectors 228. Alarm output connectors 226 transmit signals to the alarm device to facilitate presenting an indication that the plasma gun has fired to create the arc plume. Capacitor status signal output connectors 228 couple to output devices 204.

In the exemplary embodiment, PCB 208 communicatively couples to input connectors 214 and output connectors 224 to facilitate communicating with the above-described devices. Moreover, PCB 208 includes circuitry for use in generating signals that cause first capacitors 210 and second capacitor 212 to release stored energy to a plasma gun. In the exemplary embodiment, PCB 208 includes a power circuit 302 that receives power from the power supply via power supply input connectors 216. Power circuit 302 provides low-voltage power, such as approximately 12 Volt power, to low-voltage electronic components of controller 108, such as integrated circuits, field-effect transistors, and the like. Power circuit 302 also converts a portion of the low-voltage power to high-voltage power for use by high-energy and high-voltage electronic components of controller 108, such as first capacitors 210 and second capacitor 212. To facilitate charging first capacitors 210 and second capacitor 212, power circuit 302 also receives input signals via capacitor charge/discharge device input connectors 218 and causes first capacitors 210 and/or second capacitor 212 to charge or discharge based on the input signals.

PCB 208 also includes a trigger circuit 304 that is communicatively coupled to the plasma gun. Trigger circuit 304 receives a relay fire signal via relay input connectors 220 to facilitate causing the plasma gun to create an arc plume to transfer the arc flash energy into arc containment device 102. For example, in response to the relay fire signal, trigger circuit 304 causes first capacitors 210 to release stored energy to the plasma gun. Moreover, trigger circuit 304 causes the plasma gun to use the released energy to create an arc plume by causing second capacitor 212 to transmit a voltage pulse signal to an autotransformer that triggers the plasma gun using a high-voltage pulse generated by an ignition coil. In response to the pulse signal, the plasma gun uses the released energy to create the arc plume.

In the exemplary embodiment, PCB 208 also includes a monitoring circuit 306 for use in monitoring the charge status of first capacitors 210 and second capacitor 212. Monitoring circuit 306 includes a first output device 308, a second output device 310, and a third output device 312. In the exemplary embodiment, first output device 308 indicates to an operator that low-voltage power supply is available, indicates that first capacitors 210 are charged to a desired level and within a desired time period, and indicates that second capacitor 212 is charged to a desired level. Second output device 310 indicates to the operator that first capacitors 210 and/or second capacitor 212 are discharged. Third output device 312 indicates to the user that first capacitors 210 and second capacitor 212 are charging or are discharging, or failed to charge within a desired time.

Figure 4:
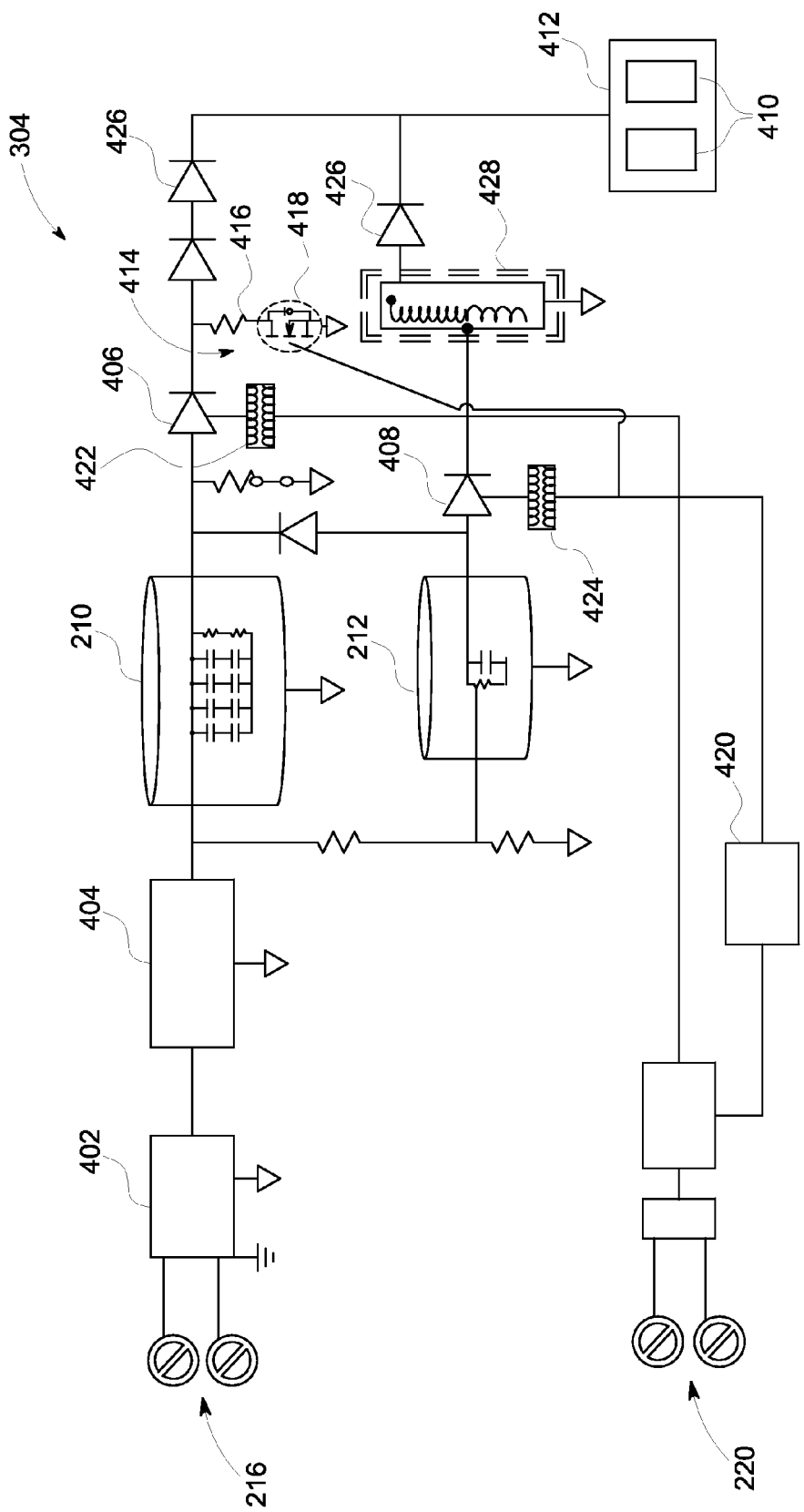
FIG. 4 is a simplified circuit diagram of an exemplary power circuit, trigger circuit, and output devices that may be used with the controller shown in FIG. 2.

FIG. 4 is a simplified circuit diagram of power circuit 302 and trigger circuit 304. In the exemplary embodiment, power circuit 302 includes one or more voltage regulators 402 that receive electrical power via power supply input connectors 216. Voltage regulators 402 condition the power and output low-voltage power for use by low-voltage electrical components of controller 108 (shown in FIG. 2). Moreover, power circuit 302 includes a voltage converter 404 that converts a portion of the low-voltage power into high-voltage power for use by high-voltage electrical components of controller 108, such as first capacitors 210 and second capacitor 212.

In the exemplary embodiment, first capacitors 210 include a bank of high-voltage, high-energy capacitors. Exemplary capacitors that may be used in the capacitor bank of first capacitors 210 include capacitors having a capacitance of approximately 180 microfarads (μF) at approximately 450 volts (V). However, it should be understood that any suitable high-voltage, high-energy capacitor may be used within first capacitors 210, including capacitors having a capacitive rating of more or less than approximately 180 μF and operating at more or less than approximately 450 V. In the exemplary embodiment, second capacitor 212 is a single high-voltage capacitor. An exemplary capacitor that may be used as second capacitor 212 is one having a capacitance of approximately 47 μF at approximately 450 V. However, it should be understood that any suitable high-voltage, high-energy capacitor may be used within second capacitor 212, including a capacitor having a capacitive rating of more or less than approximately 47 μF and operating at more or less than approximately 450 V.

In the exemplary embodiment, trigger circuit 304 is coupled to a detection circuit (not shown) that detects a fault, such as a primary arc flash, on a circuit and transmits a signal indicative of the fault to trigger circuit 304 via relay input connectors 220. Trigger circuit 304 includes a first logic device 406 and a second logic device 408. In the exemplary embodiment, first and second logic devices 406 and 408 are silicon-controlled rectifiers that facilitate preventing migration of electrical energy from first capacitors 210 and/or second capacitor 212 to plasma gun electrodes 410 used to generate a plasma plume. More specifically, first and second logic devices 406 and 408 are used as semiconductor switches that are triggered during an arc event such as a primary arc flash. First logic device 406 is communicatively coupled to first capacitors 210 and to a plasma gun 412. Similarly, second logic device 408 is communicatively coupled to second capacitor 212 and to plasma gun 412. In addition, to ensure that leakage from first logic device 406 does not build up high voltage onto plasma gun 412 when first logic device 406 is in an off state, trigger circuit 304 includes a bleed-off device 414. An exemplary bleed-off device 414 includes a resistor 416 and a transistor 418, such as a MOSFET transistor, are placed in trigger circuit 304. In an exemplary embodiment, resistor 416 and transistor 418 substantially prevent accumulation of voltage between plasma gun electrodes 410 over time. Such an accumulation of voltage can cause the air gap between plasma gun electrodes 410 to degrade, which can result in a nuisance fire of circuit protection device 100. In alternative embodiments, bleed-off device 414 includes different configuration of transistors, such as NPN to PNP bipolar junction transistors, and/or P-channel to N-channel MOSFETs.

A timer device 420 is communicatively coupled to the detection circuit and second logic device 408. Timer device 420 delays transmission of the arc event detection signal from the detection circuit to second logic device 408. For example, the detection circuit transmits the detection signal to first logic device 406 and timer device 420 delays transmission of the detection signal to second logic device 408 by a preselected time period, such as approximately eight microseconds. More specifically, the detection circuit transmits the detection signal to a first pulse transformer 422 that is communicatively coupled to the detection device and first logic device 406. Similarly, timer device 420 transmits the detection signal to a second pulse transformer 424 that is communicatively coupled to timer device 420 and second logic device 408. An output of first logic device 406 is communicatively coupled to at least one blocking diode 426 that prevents reverse current flow from plasma gun electrodes 410 to first logic device 406. Moreover, an output of second logic device 408 is communicatively coupled to an ignition coil 428 that generates a high-voltage pulse signal that causes plasma gun 412 to generate a plasma plume using electrical energy released or transmitted to plasma gun 412 by first capacitors 210. An output of ignition coil 428 is communicatively coupled to a blocking diode 426 that prevents reverses current flow from plasma gun electrodes 410 to ignition coil 428 and/or second logic device 408.

Figure 5:
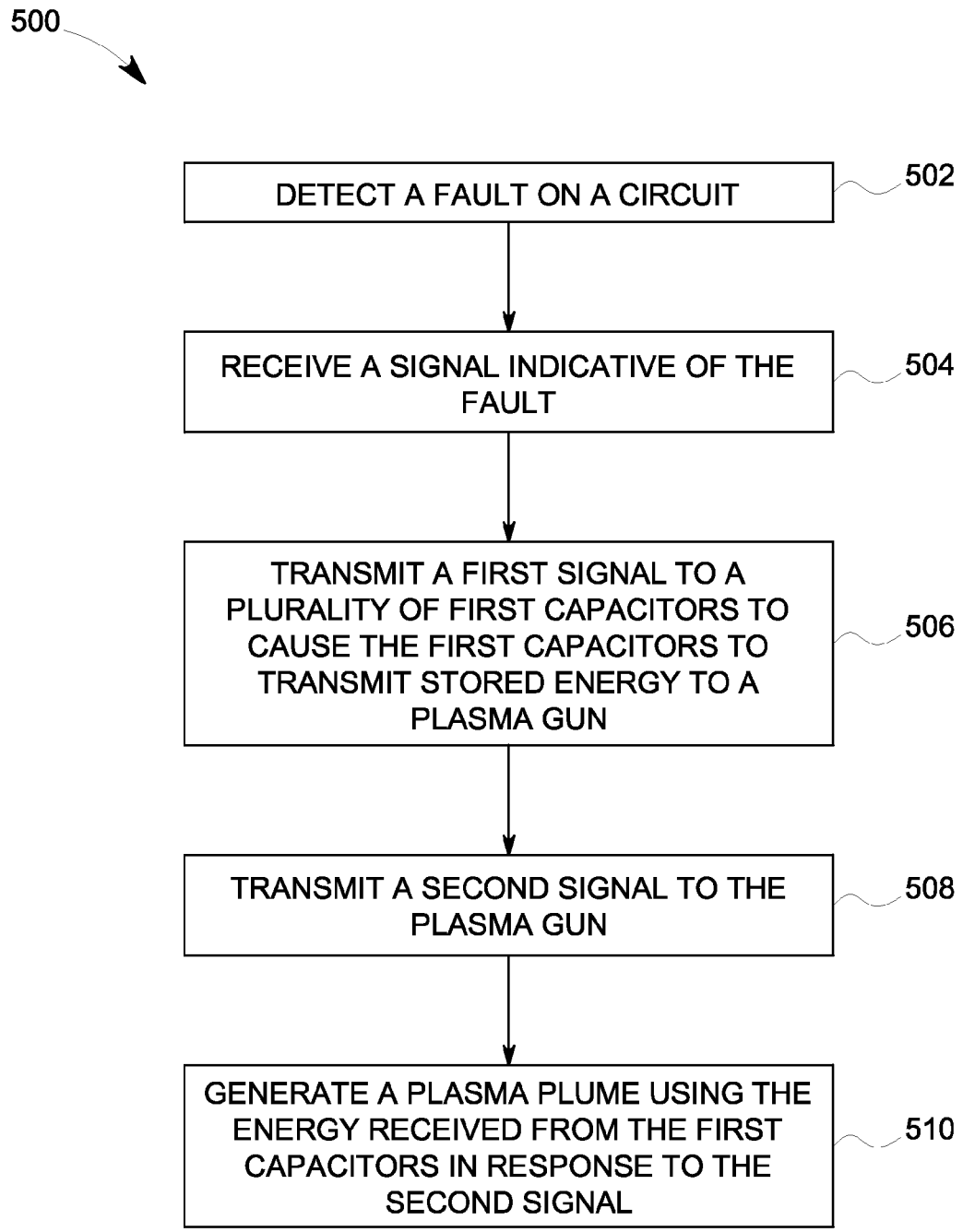
FIG. 5 is a flowchart illustrating an exemplary method that may be used to control the controller shown in FIG. 2.

FIG. 5 is a flowchart 500 that illustrates an exemplary method. More specifically, flowchart 500 illustrates an exemplary method for triggering generation of a plasma plume using trigger circuit 304 and plasma gun 412 (both shown in FIG. 4). In the exemplary embodiment, a detection circuit (not shown) detects 502 a fault on a circuit, such as a primary arc flash. Trigger circuit 304 receives 504 a signal indicative of the fault from the detection circuit. For example, first pulse transformer 422 and second pulse transformer 424 (both shown in FIG. 4) each receive the signal from the detection circuit. However, timer device 420 delays transmission of the signal to second pulse transformer 424 by a preselected time period after the signal has been transmitted to first pulse transformer 422.

In the exemplary embodiment, trigger circuit 304 transmits 506 a first signal to first capacitors 210 (shown in FIG. 3) to cause first capacitors 210 to transmit stored electrical energy to plasma gun 412. For example, first pulse transformer 422 receives the signal from the detection circuit and transmits the first signal to first logic device 406 (shown in FIG. 4). In response to the first signal, first logic device 406 is activated and enables first capacitors 210 to release at least a portion of the electrical energy stored therein to plasma gun electrodes 410 (shown in FIG. 4). The electrical energy released by first capacitors 210 may also be referred to herein as a first portion of a cumulative amount of electrical energy stored in first capacitors 210 and second capacitor 212.

Moreover, in the exemplary embodiment, trigger circuit 304 transmits 508 a second signal to plasma gun 412 to cause plasma gun 412 to generate 510 the plasma plume using the electrical energy released by first capacitors 210. For example, timer device 420 receives the signal from the detection circuit and transmits the signal to second pulse transformer 424 after a preselected time period. The preselected time period enables the electrical energy stored by first capacitors 210 to be transmitted to plasma gun electrodes 410. Second pulse transformer 424 receives the signal from timer device 420 and transmits the second signal to second logic device 408 (shown in FIG. 4). In response to the second signal, second logic device 408 is activated and enables second capacitor 212 (shown in FIG. 4) to release at least a portion of the electrical energy stored therein to ignition coil 428 (shown in FIG. 4). Ignition coil 428 uses the electrical energy to generate a high-energy pulse signal and transmits the pulse signal to plasma gun electrodes 410. The pulse signal causes plasma gun electrodes 412 to generate the plasma plume that transfers the arc flash energy into arc containment device 102 (shown in FIG. 1). The electrical energy released by second capacitor 212 may also be referred to herein as a second portion of a cumulative amount of electrical energy stored in first capacitors 210 and second capacitor 212.

Exemplary embodiments of systems, methods, and apparatus for triggering generation of a plasma plume within a circuit protection device are described above in detail. The systems, methods, and apparatus are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Although the present invention is described in connection with an exemplary circuit protection system, embodiments of the invention are operational with numerous other general purpose or special purpose circuit protection systems or configurations. The circuit protection system described herein is not intended to suggest any limitation as to the scope of use or functionality of any aspect of the invention. Moreover, the circuit protection system described herein should not be interpreted as having any dependency or requirement relating to any one or combination of components illustrated in the exemplary operating environment.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein.

For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A circuit protection device comprising:
   a plasma gun configured to generate a plasma plume;
   at least one capacitor configured to store electrical energy; and
   a trigger circuit communicatively coupled to said plasma gun and to said at least one capacitor, said trigger circuit configured to:
      generate a first signal to cause said at least one capacitor to transmit a first portion of the electrical energy to said plasma gun; and
      generate a second signal to cause said plasma gun to generate the plasma plume using the first portion of the electrical energy.

2. A circuit protection device in accordance with claim 1, wherein said plasma gun comprises a plurality of electrodes and said at least one capacitor comprises at least one first capacitor configured to transmit the first portion of the electrical energy to said plurality of electrodes.

3. A circuit protection device in accordance with claim 2, wherein said at least one capacitor further comprises a second capacitor configured to store a second portion of the electrical energy and transmit the second portion of the electrical energy to said plurality of electrodes in response to the second signal, said plurality of electrodes configured to generate the plasma plume using the electrical energy.

4. A circuit protection device in accordance with claim 1, wherein said trigger circuit comprises an ignition coil communicatively coupled to said at least one capacitor and configured to transmit the second portion of the electrical energy to said plasma gun as a pulse.

5. A circuit protection device in accordance with claim 1, wherein said trigger circuit comprises a timer configured to delay transmission of the second signal for a preselected time period after the first portion of the electrical energy is transmitted to said plasma gun.

6. A circuit protection device in accordance with claim 1, wherein said trigger circuit comprises at least one pulse transformer configured to:
   receive a detection signal indicative of a fault;
   generate the first signal to cause said at least one capacitor to transmit the first portion of the electrical energy to said plasma gun; and
   generate the second signal.

7. A circuit protection device in accordance with claim 6, wherein said trigger circuit further comprises at least one logic device communicatively coupled to said at least one capacitor and said at least one said pulse transformer, said at least one logic device configured to:
   receive the first signal and the second signal from said at least one at least one pulse transformer;
   cause said at least one capacitor to transmit the first portion of the electrical energy to said plasma gun; and
   cause said at least one capacitor to transmit a second portion of the electrical energy to said plasma gun.

8. A circuit protection device in accordance with claim 6, wherein said trigger circuit further comprises a bleed-off device communicatively coupled to said at least one capacitor and said at least one pulse transformer, said bleed-off device configured to prevent the electrical energy from being transmitted to said plasma gun prior to transmission of the first signal.

9. A controller for use with a circuit protection device having a plasma gun, said controller comprising:
   a plurality of capacitors comprising:
      a plurality of first capacitors configured to provide a first portion of electrical energy to the plasma gun; and
      a second capacitor configured to provide a second portion of the electrical energy to cause a pulse to be transmitted to the plasma gun to cause the plasma gun to create a plasma plume; and
   a trigger circuit communicatively coupled to said plurality of capacitors and configured to:
      receive a detection signal indicative of a fault;
      cause said plurality of first capacitors to transmit the first portion of the electrical energy to the plasma gun; and
      cause said second capacitor to provide the second portion of the electrical energy to cause the pulse to be transmitted to the plasma gun.

10. A controller in accordance with claim 9, wherein said trigger circuit comprises a first pulse transformer communicatively coupled to a detection circuit, said first pulse transformer configured to receive the detection signal indicative of the fault from the detection circuit and to generate a first signal to cause said plurality of first capacitors to transmit the first portion of the electrical energy to the plasma gun.

11. A controller in accordance with claim 10, wherein said trigger circuit further comprises a second pulse transformer communicatively coupled to the detection circuit, said second pulse transformer configured to receive the detection signal indicative of the fault from the detection circuit and to generate a second signal to cause said second capacitor to provide the second portion of the electrical energy to the plasma gun.

12. A controller in accordance with claim 11, wherein said trigger circuit further comprises a timer communicatively coupled to said second pulse transformer, said timer configured to receive the detection signal indicative of the fault from the detection circuit and to transmit the detection signal to said second pulse transformer a preselected time period after said first pulse transformer transmits the first signal.

13. A controller in accordance with claim 11, wherein said trigger circuit further comprises:
   a first logic device communicatively coupled to said plurality of first capacitors and said first pulse transformer, said first logic device configured to receive the first signal from said first pulse transformer and cause said plurality of first capacitors to transmit the electrical energy to the plasma gun; and
   a second logic device communicatively coupled to said second capacitor and said second pulse transformer, said second logic device configured to receive the second signal from said second pulse transformer and cause the pulse to be transmitted to the plasma gun.

14. A controller in accordance with claim 9, wherein said trigger circuit comprises an ignition coil communicatively coupled to said second capacitor and configured to generate the pulse using the second portion of the electrical energy stored by said second capacitor.

15. A controller in accordance with claim 9, wherein said trigger circuit comprises at least one blocking diode configured to prevent current flow from the plasma gun to said plurality of capacitors.

16. A method for triggering generation of a plasma plume by a circuit protection device having a plasma gun, at least one first capacitor, and at least one second capacitor, said method comprising:
receiving a detection signal indicative of a fault;
generating a first signal to cause the at least one first capacitor to transmit stored electrical energy to the plasma gun; and
generating a second signal to cause the plasma gun to generate the plasma plume using the electrical energy.

17. A method in accordance with claim 16, wherein generating a first signal comprises:
receiving, by a first pulse transformer, the detection signal indicative of the fault; and
transmitting the first signal, by the first pulse transformer, to a first logic device.

18. A method in accordance with claim 17, wherein generating a second signal comprises:
receiving, by a second pulse transformer, the detection signal indicative of the fault; and
transmitting the second signal, by the second pulse transformer, to a second logic device.

19. A method in accordance with claim 18, wherein receiving the detection signal indicative of the fault comprises delaying transmission of the detection signal to the second pulse transformer using a timer.

20. A method in accordance with claim 16, wherein generating a second signal comprises:
transmitting electrical energy stored within the at least one second capacitor to an ignition coil; and
transmitting a pulse signal to the plasma gun to cause the plasma gun to generate the plasma plume using the electrical energy transmitted by the at least one first capacitor.

* * * * *